United States Patent

Bux et al.

[11] Patent Number: 6,003,367
[45] Date of Patent: Dec. 21, 1999

[54] METHOD FOR OPERATING A BALANCING MACHINE AND A CONTROL ELEMENT

[75] Inventors: Hermann Bux, Pocking; Peter Ross, Munich; Stefan Schommer, Martinsried, all of Germany

[73] Assignee: Beissbarth GmbH, Munich, Germany

[21] Appl. No.: 08/656,312

[22] PCT Filed: Sep. 7, 1995

[86] PCT No.: PCT/EP95/03516

§ 371 Date: Jun. 10, 1996

§ 102(e) Date: Jun. 10, 1996

[87] PCT Pub. No.: WO96/07879

PCT Pub. Date: Mar. 14, 1996

[30] Foreign Application Priority Data

Sep. 8, 1994 [DE] Germany ............................ 44 32 015

[51] Int. Cl.⁶ .................................................. G01M 1/02
[52] U.S. Cl. .............................. 73/462; 345/184; 73/487; 200/4
[58] Field of Search ................... 73/462, 487; 301/5.21; 345/184; 364/508; 338/32 H; 200/4, 14; 702/56

[56] References Cited

U.S. PATENT DOCUMENTS

| 3,726,145 | 4/1973 | Bedford et al. .......................... 73/462 |
| 4,320,267 | 3/1982 | Greve et al. ................................. 200/4 |
| 4,439,654 | 3/1984 | Bresin et al. ........................ 200/302.1 |
| 5,156,049 | 10/1992 | Douglas .................................... 73/462 |
| 5,440,325 | 8/1995 | Edmark, III ............................ 345/145 |
| 5,544,073 | 8/1996 | Piety et al. .............................. 364/508 |

OTHER PUBLICATIONS

Patent Abstracts of Japan, vol. 17, No. 665 (E–1472), Dec. 8, 1993.

Primary Examiner—John E. Chapman
Attorney, Agent, or Firm—Hazel & Thomas

[57] ABSTRACT

A method for single-knob operation of a balancing machine is characterized by a program-controlled run of the balancing process which is controllable in steps via a single-knob control element. In this method, operating the single-knob control element at predetermined steps of the program triggers functions which depend on the current status of the program-controlled run. A single-knob control element is provided for carrying out the method.

10 Claims, 2 Drawing Sheets

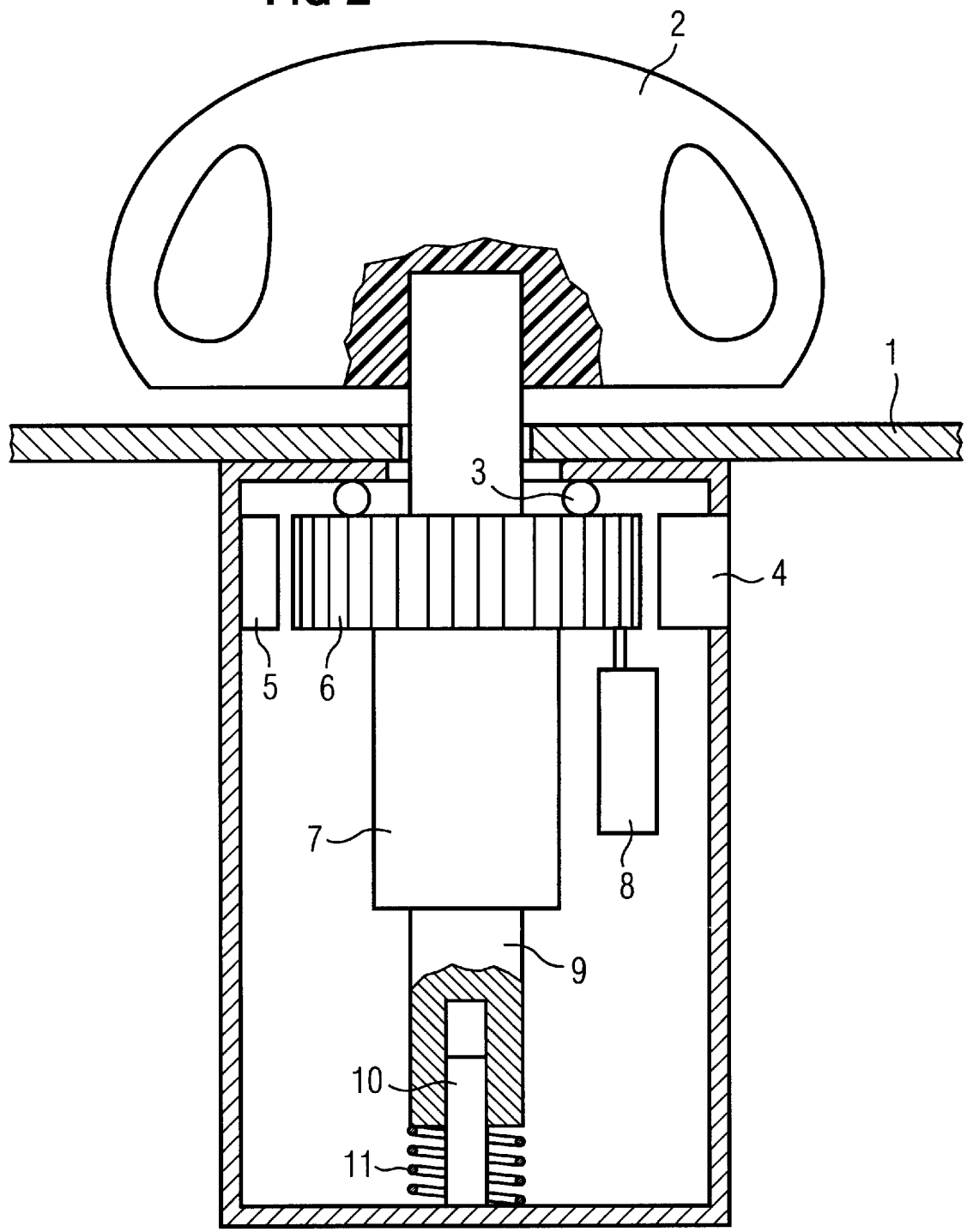

METHOD FOR OPERATING A BALANCING MACHINE AND A CONTROL ELEMENT

BACKGROUND OF THE INVENTION

This invention relates to a method for operating a balancing machine and to a control element for carrying out the method.

Conventional wheel balancing machines are operated via a plurality of buttons and/or keys. This requires exact knowledge of all control elements on the part of the user. If the user is not especially skilled in handling the machine, he must engage in a time-consuming search for the control elements on the control console. This can easily lead to errors which prolong the wheel balancing process and/or falsify the results.

The problem of the invention is to simplify operation of the machine so that an operator with no detailed knowledge of the balancing process can nevertheless handle the machine well.

This problem is solved by the method according to the invention of operating a balancing machine wherein the run of the balancing process is program controlled, and the program-controlled run runs in steps, stops or can be stopped at suitable points via a single-knob control element. The single-knob control element at predetermined steps of the program triggers functions which depend on the current status of the program-controlled run. Operating the single-knob control element in a primary mode triggers primary functions which control the run according to a predetermined standard program, and operating the single-knob control element in a secondary mode triggers secondary functions which allow deviation from the standard program at the predetermined steps. The primary functions include starting and stopping a balancing run, and the secondary functions include at least calling a help function.

The invention also includes a control element for operating a balancing machine, comprising a control element having a single-knob control element which is operable independently in at least a primary and a secondary mode. The single-knob control element is movable axially for executing the primary mode by depressing the control element, and mounted rotatably for executing the secondary mode by turning the single-knob control element. A button (2) is disposed on an axle (9) which is centered by a centering device (10) and mounted movably in the vertical direction. A gearwheel (6) is disposed on the axle (9) for cooperating with sensors (5) as incremental transducers, and a microswitch (8) is mounted below the gearwheel in the direction of the axle (9), said switch being operable by the gearwheel (6).

SUMMARY OF THE INVENTION

According to the invention a program-controlled balancing run for balancing a wheel can be performed merely by operating one control element, preferably a single-knob control element. This simplifies operation of the machine to such an extent that an operator need no longer have any detailed knowledge of the balancing process and misoperation is largely excluded.

For this purpose the invention automates the balancing process up to a degree which is exactly appropriate for the specific requirements of balancing. The single-knob operation is preferably designed in such a way that the program runs in steps, stops or can be stopped at suitable points during the run of the balancing process, and is continued by a press on the button after a time determined by the operator. In the holding phase the operator has enough time to mount balancing weights for example. The working step is preferably confirmed by a press on the button and the program assumes the next logical function for the balancing run in accordance with the current program status.

The single-knob control element preferably includes at least two actuating modes which cause different functions:

pressing the button triggers primary functions, for example "Start balancing run" or "Switch balancing plane"; and turning the button triggers secondary functions, for example input or help functions.

In a further embodiment one can provide pulling button as an additional possible actuation.

BRIEF DESCRIPTION OF THE DRAWINGS

In the following the invention will be described in a preferred embodiment with reference to the accompanying drawings, in which:

FIG. 2 is a schematic representation of a single-knob control element in a preferred embodiment of the invention.

DETAILED DESCRIPTION OF THE PREFERRED EMBODIMENT

Figure 1:
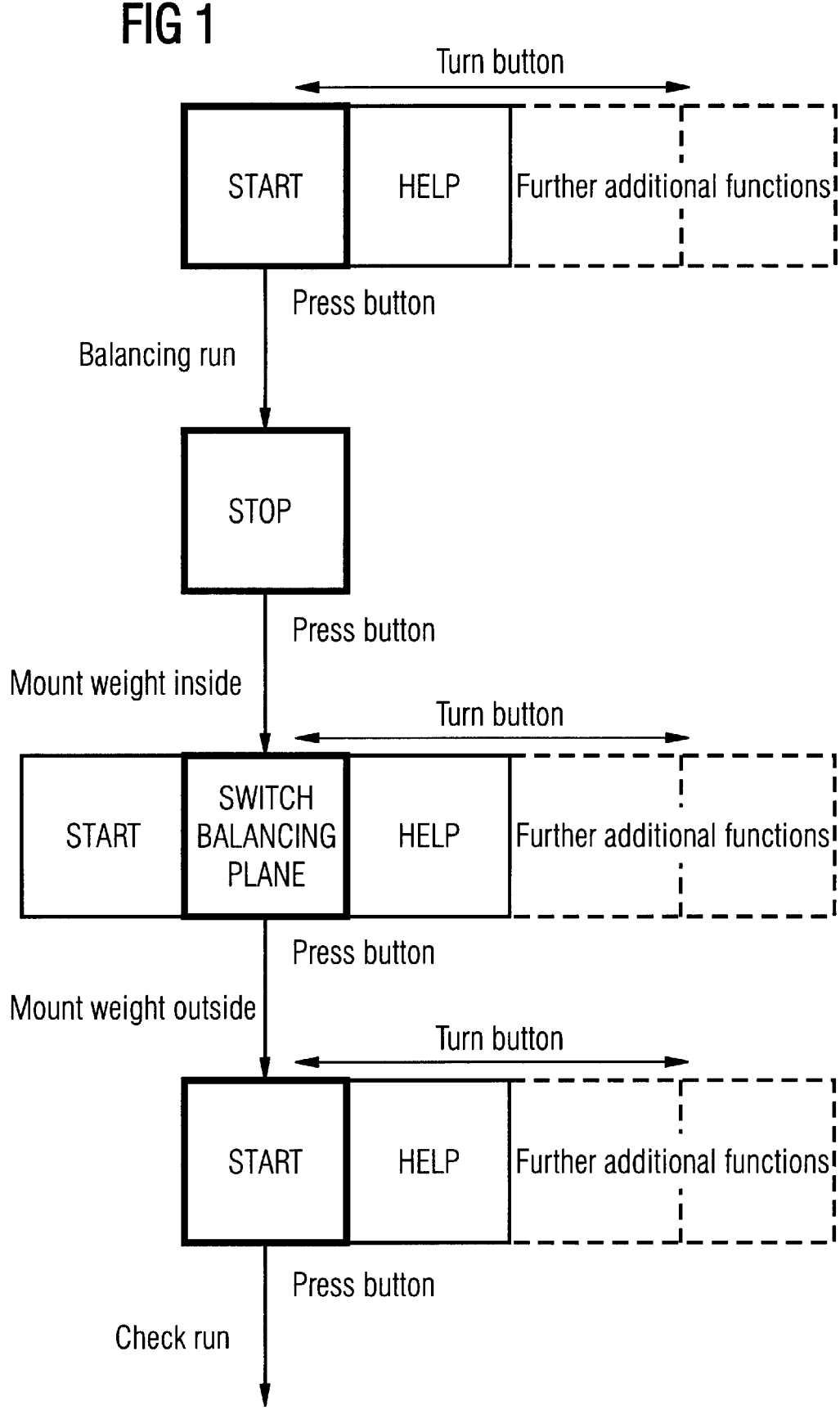
FIG. 1 shows a flow chart for a balancing run according to a preferred embodiment of the invention.

FIG. 1 shows an example of a balancing run, whereby the boxes bordered with heavy lines represent "primary functions" and the boxes shown with thinner or dotted lines designate "secondary functions".

Primary functions are those functions which carry the logical standard run of the balancing process, for example "Start balancing run", "Stop balancing run", "Switch balancing plane", "Start check run", etc. A simple press on the button produces the standard run (vertical, heavy boxes). The secondary functions can be called by turning the control element on each level.

The secondary functions relate for example to calling up a help menu, inputs or other additional functions.

In the example of FIG. 1 the balancing run can either be started at the outset directly by pressing the button for triggering the primary function "Start", or a secondary function, for example "Help", can be activated first by turning the button and pressing at the desired position. The selected functions can be indicated on a display or the like.

When the primary function "Start" has been triggered the balancing run begins. It runs until it is stopped either automatically by the program itself or by a press on the button triggering the primary function "Stop". The user now has time to mount balancing weights inside on the wheel rim.

A further press on the button triggers the primary function "Switch balancing plane", and the same process is repeated for mounting the balancing weights on the outside.

After the weights have been mounted inside and outside on the balancing planes a check run is started, and if the result is satisfactory the balancing run is ended.

FIG. 2 shows a preferred embodiment for a single-knob control element which is provided on housing wall 1 and connected with the balancing machine (not shown). The element includes button 2 which is located above housing wall 1 and operated by the user. Distance bearing 3 is located between housing wall 1 and gearwheel 6 for rotatably mounting the button around axle 9. Disposed near gearwheel 6 are magnet 5 for a magnetic catch and Hall sensors 4 as incremental transducers. Below the gearwheel spherical liner 7 is provided around axle 9. Microswitch 8 is mounted beside spherical liner 7 below gearwheel 6. Axle 9 is mounted on spring 11 around centering device 10.

The shown single-knob control element can be operated both by pressing (primary mode) and by turning (secondary mode). The rotary motions on button 1 are transferred via axle 9 to gearwheel 6 and detected there by the Hall sensors. Magnet 5 causes a magnetic catch to facilitate operation of the button in the known way. The button is held up by spring 11 via axle 9 and centered by centering device 10. A press on button 1 against the force of spring 11 acts via axle 9 and gearwheel 6 on microswitch 8 which is switched by the vertical motion of the gearwheel.

The above construction allows the single-knob control element to be operated independently in both modes, i.e. the button can be pressed in any rotary position.

The output signals are fed, after being processed in an analog-to-digital circuit, to a computer which steers the balancing run of the balancing machine in program-controlled fashion.

We claim:

1. A method for operating a balancing machine, wherein the run of the balancing process is program-controlled, and the program-controlled run runs in steps, stops or can be stopped at suitable points via a single-knob control element.

2. The method of claim 1, wherein the single-knob control element at predetermined steps of the program triggers functions which depend on the current status of the program-controlled run.

3. The method of claim 2, wherein operating the single-knob control element in a primary mode triggers primary functions which control the run according to a predetermined standard program, and operating the single-knob control element in a secondary mode triggers secondary functions which allow deviation from the standard program at the predetermined steps.

4. The method of claim 3, wherein the primary functions include starting and stopping a balancing run, and the secondary functions include at least calling a help function.

5. A control element for operating a balancing machine, comprising a control element having a single-knob control element which is operable independently in at least a primary and a secondary mode, the single-knob control element being movable axially for executing the primary mode by depressing the control element, and mounted rotatably for executing the secondary mode by turning the single-knob control element, the single-knob control element comprising a button disposed on an axle which is centered by a centering device and mounted movably in the axial direction.

6. The control element of claim 5, wherein a gearwheel is disposed on the axle for cooperating with sensors as incremental transducers, and a microswitch is mounted below the gearwheel in the direction of the axle, said switch being operable by the gearwheel.

7. A method for operating a balancing machine, comprising the steps of:

program-controlling a run of a balancing process;

providing a single-knob control element for controlling said balancing process;

selectively controlling said balancing process via said single-knob control element, wherein said selective controlling includes running in steps and stopping said balancing process at selected points during operation thereof.

8. The method of claim 7, wherein said step of selectively controlling said balancing process includes triggering functions via said single-knob control element based on a current status of the program-controlled run.

9. The method of claim 8, wherein said step of selectively controlling said balancing process further includes operating said single-knob control element in a primary mode so as to trigger primary functions that control the run according to a predetermined standard program, and operating the single-knob control element in a secondary mode so as to trigger secondary functions which allow deviation from the standard program at predetermined steps.

10. The method of claim 9, wherein the primary functions include starting and stopping a balancing run, and the secondary functions include at least calling a help function.

* * * * *